(12) United States Patent
Zhan

(10) Patent No.: US 11,980,829 B2
(45) Date of Patent: May 14, 2024

(54) WHACK-A-MOLE TOY

(71) Applicant: Donger Zhan, Shantou (CN)

(72) Inventor: Donger Zhan, Shantou (CN)

(*) Notice: Subject to any disclaimer, the term of this patent is extended or adjusted under 35 U.S.C. 154(b) by 0 days.

(21) Appl. No.: 18/302,928

(22) Filed: Apr. 19, 2023

(65) Prior Publication Data
US 2023/0249093 A1 Aug. 10, 2023

(30) Foreign Application Priority Data
Dec. 28, 2022 (CN) .......................... 202223544976.4

(51) Int. Cl.
*A63H 33/30* (2006.01)
*A63H 29/24* (2006.01)

(52) U.S. Cl.
CPC ............. *A63H 33/30* (2013.01); *A63H 29/24* (2013.01)

(58) Field of Classification Search
CPC ................................ A63H 33/30; A63H 29/24
USPC ............................. 446/1, 486, 491; 273/451
See application file for complete search history.

(56) References Cited

U.S. PATENT DOCUMENTS

| | | | | |
|---|---|---|---|---|
| 2,540,061 A * | 1/1951 | Szantay | ................. | A63H 33/00 235/90 |
| 2,646,646 A * | 7/1953 | Glass | ..................... | A63H 33/00 124/37 |
| 2,774,179 A * | 12/1956 | Zalkind | .................. | A63H 33/00 434/258 |
| 3,138,894 A * | 6/1964 | La Reaux | .............. | A63H 33/00 446/1 |
| 3,894,353 A * | 7/1975 | Oguchi | .................. | A63H 13/20 446/486 |
| 4,310,156 A * | 1/1982 | Kulesza | .................... | A63F 9/06 273/447 |
| 4,541,812 A * | 9/1985 | Katsumata | ............. | A63H 33/22 446/485 |
| 5,207,793 A * | 5/1993 | Brand | ....................... | A63F 9/30 273/440 |
| D343,656 S * | 1/1994 | Shiraishi | ................... | G09F 1/04 D21/470 |
| D349,135 S * | 7/1994 | Strayer | ................ | A63H 33/042 D21/470 |
| 5,484,318 A * | 1/1996 | Mayert | ..................... | A63F 9/00 446/491 |
| 5,947,478 A * | 9/1999 | Kwan | ................... | A63F 9/0096 273/460 |
| 6,283,762 B1 * | 9/2001 | Wiggins | ................. | G09B 19/00 446/72 |
| 6,893,316 B2 * | 5/2005 | Maxwell | .............. | A63H 33/042 446/246 |

(Continued)

Primary Examiner — Joseph B Baldori
(74) Attorney, Agent, or Firm — Zhigang Ma

(57) ABSTRACT

A key pressing toy with reset function relates to the technical field of toys, including a shell, a pressing assembly arranged on the shell, and a reset assembly slidingly arranged on the shell; the pressing assembly includes a plurality of reset keys exposed outside the shell; the reset assembly includes an elastic member arranged in the shell, a reset seat slidingly arranged on the shell, a pushing member arranged on the reset seat, and the reset seat is exposed outside the shell; and when the reset keys are pressed, they will depress inside the shell, the reset seat drives the pushing member to slide, the pushing member pushes the reset keys back to their original positions, and the elastic member provides acting force that drives the reset seat to reset.

8 Claims, 7 Drawing Sheets

(56) References Cited

U.S. PATENT DOCUMENTS

| | | | | |
|---|---|---|---|---|
| 6,978,561 | B1 * | 12/2005 | Hunter | G09F 1/04 |
| | | | | 40/124.03 |
| 7,374,481 | B2 * | 5/2008 | Rehkemper | A63F 3/00643 |
| | | | | 446/175 |
| 8,075,400 | B2 * | 12/2011 | Matsuyama | A63F 13/42 |
| | | | | 463/36 |
| 8,647,203 | B2 * | 2/2014 | Albrecht | G06Q 30/0207 |
| | | | | 200/16 R |
| 8,657,294 | B2 * | 2/2014 | Tsai | A63F 9/0096 |
| | | | | 273/459 |
| 8,920,207 | B2 * | 12/2014 | Hageman | A63H 33/086 |
| | | | | 446/124 |
| D947,953 | S * | 4/2022 | Cui | A63F 9/30 |
| | | | | D21/468 |
| D974,488 | S * | 1/2023 | Yin | D21/468 |
| 2006/0188851 | A1 | 8/2006 | Duprey | |
| 2009/0224481 | A1 * | 9/2009 | Mukasa | A63F 9/30 |
| | | | | 273/454 |
| 2015/0283454 | A1 * | 10/2015 | Wei | A63F 9/0096 |
| | | | | 463/7 |
| 2017/0236430 | A1 | 8/2017 | Kalia et al. | |
| 2018/0311590 | A1 * | 11/2018 | Rasmussen | G02B 6/0005 |
| 2019/0022545 | A1 | 1/2019 | Gunawardana | |
| 2019/0275285 | A1 * | 9/2019 | Delp | A61M 21/02 |

\* cited by examiner

WHACK-A-MOLE TOY

TECHNICAL FIELD

The present disclosure relates to the technical field of toys, in particular to a key pressing toy with reset function.

BACKGROUND

A key pressing toy with reset function allows users to determine whether pressing or tapping is necessary based on brightness or protrusion of a target object on the toy. After pressing or tapping, the target object will retract into the toy, which can provide good training for users' hands-on and observation abilities.

However, a reset process of the target object retracted into the toy is more tedious, the user needs to disassemble a shell, and push each retracted target object to an initial position, so as to complete the reset of the target object, and the whole reset process is tedious. Further, a young user cannot complete the reset of the target object independently, so the product has poor age universality.

SUMMARY

In order to solve or partially solve the problems existing in the related technology, the present disclosure provides a key pressing toy with reset function, which can complete the reset quickly and conveniently, and the product has strong age universality.

The present disclosure provides a key pressing toy with reset function, including a shell, a pressing assembly arranged on the shell, and a reset assembly slidingly arranged on the shell.

The pressing assembly includes a plurality of reset keys exposed outside the shell.

The reset assembly includes an elastic member arranged in the shell, a reset seat slidingly arranged on the shell, a pushing member arranged on the reset seat, and the reset seat is exposed outside the shell.

When the reset keys are pressed, they will depress inside the shell. The reset seat drives the pushing member to slide, the pushing member pushes the reset keys for sliding reset or deformation reset, and the elastic member provides acting force that drives the reset seat to reset.

In some embodiments, the pressing assembly further includes a rubber member, and a plurality of positions, away from the shell, on the rubber member raise to form various reset keys.

In some embodiments, the reset keys are hemispheroidal.

In some embodiments, the pressing assembly further includes a support member arranged in the shell, and a key board provided with the reset keys.

A plurality of avoiding holes are formed in the support member, various avoiding holes correspond one by one and are flush with the reset keys, and the key board is propped to the support member.

In some embodiments, a positioning slot is formed on a periphery of the support member, a positioning skirt is arranged on a periphery of the key board, and the positioning skirt is detachably inserted into the positioning slot.

In some embodiments, the pushing member includes a plurality of pushing columns, which are arranged on the reset seat in respective, and each pushing column is driven by the reset seat so as to correspond and push the reset keys one by one for resetting.

In some embodiments, the key pressing toy with reset function further includes a circuit board, on which a plurality of through holes are formed, and the pushing columns pass through the through holes correspondingly.

In some embodiments, at least one sliding slot is formed in the shell, at least one sliding portion is arranged on the reset seat, and the sliding portion is slidingly arranged in the sliding slot.

In some embodiments, a plurality of switches are arranged on the circuit board, and each switch is turned off due to the pushing of the reset seat.

In some embodiments, the key pressing toy with reset function further includes a plurality of light-emitting members, which illuminate the reset keys correspondingly.

The technical solution provided by the present disclosure may include the following beneficial effects.

The key pressing toy with reset function provided by the present disclosure relates to the technical field of toys. On the key pressing toy with reset function, the user can press the reset seat exposed outside the shell to push the reset keys retracted into the shell to their respective original positions. drive the pushing member to push and retract into the reset keys in the shell for resetting by pressing the reset seat exposed outside the shell, so as to quickly complete the reset of each reset key. Thus, the user does not need to disassemble the shell or gradually reset each reset key, so the reset convenience of the reset keys is effectively improved, and at the same time, the young user can complete the reset independently, and the age universality of the product is enhanced.

It should be understood that general description above and the detailed description below are only illustrative and explanatory and do not restrict the present disclosure.

BRIEF DESCRIPTION OF THE DRAWINGS

The exemplary implementation modes of the present disclosure are described in more detail in combination with drawings, so the above and other purposes, features and advantages of the present disclosure will become more obvious. In the exemplary implementation modes of the present disclosure, the same reference signs usually stand for the same components.

DETAILED DESCRIPTION OF THE EMBODIMENTS

Figure 1:
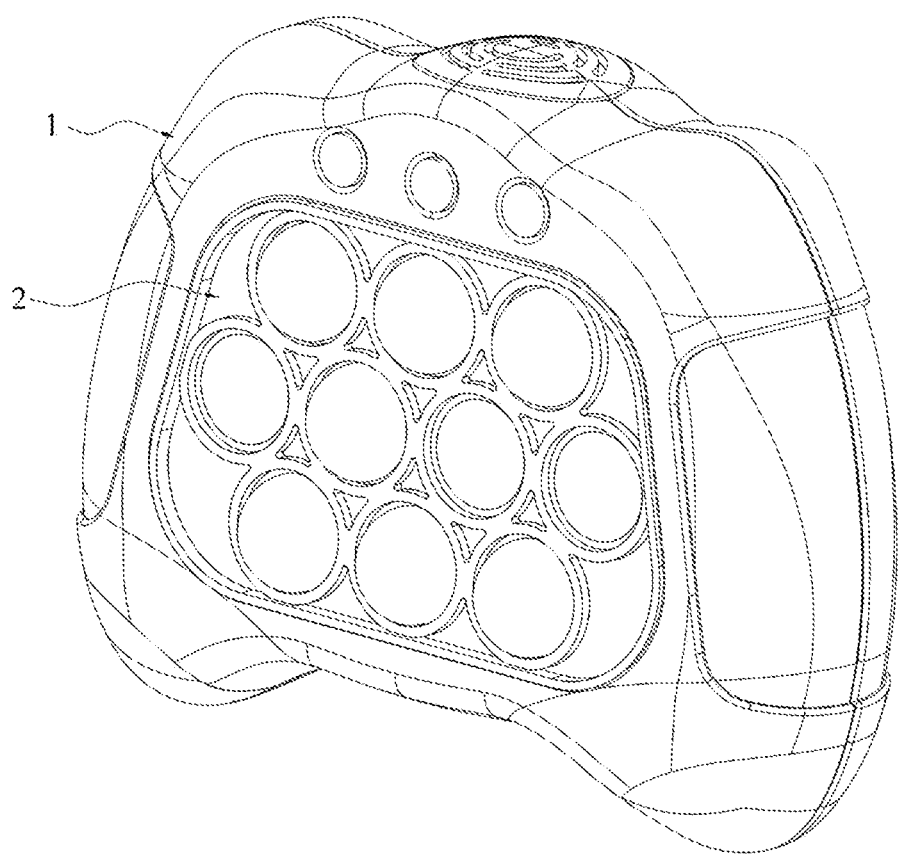
FIG. 1 is a structural schematic diagram of a key pressing toy with reset function shown in embodiments of the present disclosure.

The following clearly and completely describes the implementation modes of the present disclosure with reference to the drawings. Although the drawings show implementation modes of the present disclosure, it should be understood that the present disclosure can be implemented in various forms and shall not be limited by implementation modes described herein. On the contrary, providing these implementation modes is to understand the present disclosure thoroughly, and the scope of the present disclosure can be completely conveyed to those skilled in the art.

It is understood that although the present disclosure may adopt terms "first", "second" and "third" for describing various information, these information should not be used for limiting these terms. These terms are merely used for distinguishing the same kind of information. For example, without deviating from the application scope of the present disclosure, the first information can be called as the second information, and similarly, the second information can also be called as the first information. Thus, the features defined with "first" and "second" may expressly or impliedly one or more features. In the description of the present disclosure, "a plurality of" means two or above two, unless specific limitation otherwise.

In the description of the present disclosure, it is understood that orientation or position relationships indicated by the terms "length", "width", "upper", "lower", "front", "rear", "left", "right", "vertical", "horizontal", "top", "bottom", "inner", "outer" and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

Unless specific regulation and limitation otherwise, terms "install", "join", "connect", "fix" and the like should be generally understood, for example, may be a fixed connection, a detachable connection, or integrated, may be a mechanical connection or an electric connection, may be a direct connection or an indirect connection through an intermediation, and may an internal connection of two elements or an interactive relationship of two elements. Those of ordinary skill in the art may understand the specific meaning of the terms in the disclosure according to specific conditions.

Figure 2:
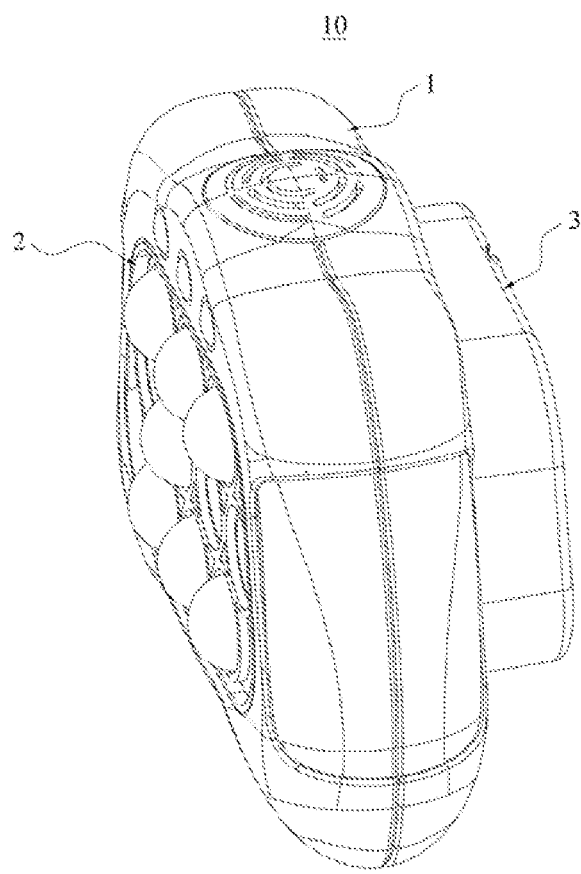
FIG. 2 is a schematic diagram of another structure of a key pressing toy with reset function shown in embodiments of the present disclosure.
Figure 3:
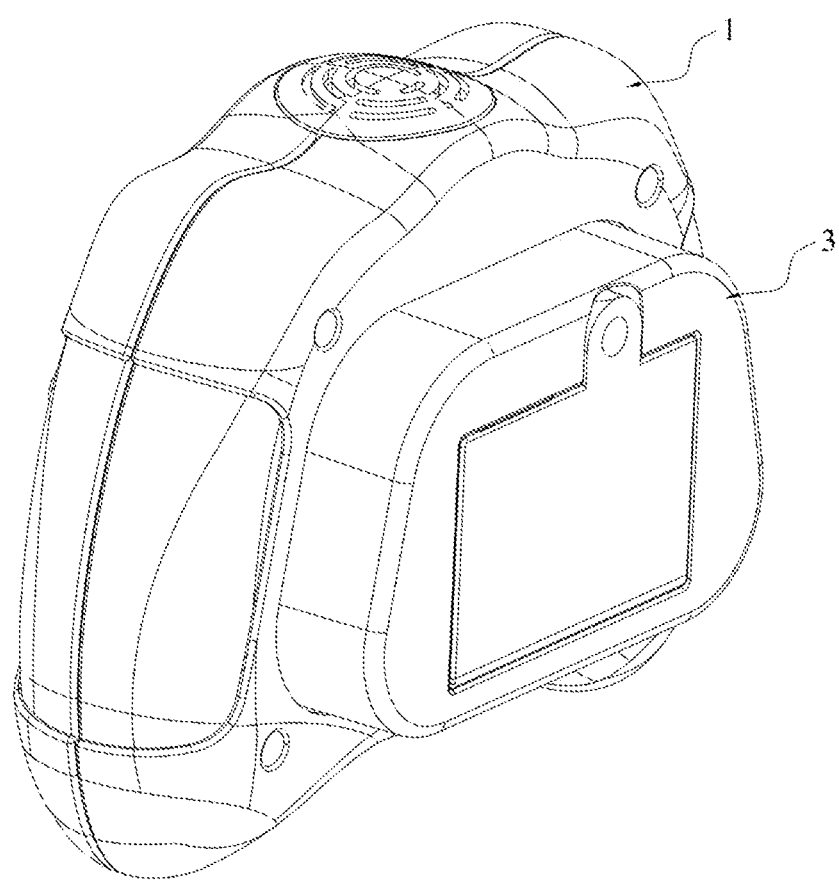
FIG. 3 is a structural schematic diagram of another angle of a key pressing toy with reset function shown in embodiments of the present disclosure.

FIG. 1 to FIG. 3 show a key pressing toy with reset function 10 in some preferred embodiments of the present disclosure. As shown in FIG. 1 to FIG. 7, a key pressing toy with reset function 10, including a shell 1, a pressing assembly 2 arranged on the shell 1, and a reset assembly 3 slidingly arranged on the shell 1. The shell 1 is configured to install the pressing assembly 2 and the reset assemble 3. The pressing assembly 2 is configured to deform or slide under external force pressing, for example, the pressing assembly 2 may deform or slide when being pressed by a user. The reset assembly 3 is configured to slide under external force action, so as to push the pressing assembly 2 for resetting, for example, the reset assembly 3 may slide when being pressed by the user.

The pressing assembly 2 includes a plurality of reset keys 21 exposed outside the shell 1; the reset assembly 3 includes an elastic member 31 arranged in the shell 1, a reset seat 32 slidingly arranged on the shell 1, a pushing member 33 arranged on the reset seat 32, and the reset seat 32 is exposed outside the shell 1.

When the reset keys 21 are pressed, they will depress inside the shell 1. The reset seat 32 drives the pushing member 33 to slide, the pushing member 33 pushes the reset keys 21 to their original positions, and the elastic member 31 provides acting force that drives the reset seat 32 to move away from the reset keys 21 to its original position where the elastic member 31 is not pressed by a user. The reset keys 21 depressed inside the shell 1 herein means that the reset keys 21 slides inside the shell 1 or are deformed inwardly in relative to the whole shell 1, and doesn't necessarily mean that the reset keys 21 themselves are deformed. Of course, the deformation of the reset keys 21 themselves is an depression of the reset keys 21 relative to the shell 1.

It can be understood that the user can press, push or knock and the like on the reset keys 21. The elastic member 31 is configured to drive the reset seat 32 to be always exposed outside the shell 1, that is, when pressing the reset seat 32, the elastic force of the elastic member 31 needs to be overcome. The pushing member 33 is configured to move in relative to the shell 1 under the drive of the reset seat 32, so as to push the reset keys 21 and make the reset keys 21 reset.

It is to be noted that the reset keys 21 may be configured to be made of materials that easily deform or do no easily deform when being stressed, preferably, the reset keys 21 are made of the materials that easily deform when being stressed, on the one hand, the comfort level of the user during a pressing operation is improved, and on the other hand, the reset keys 21 have higher deformability and are not easily damaged. For example, the reset keys 21 may be made of rubber. When a plurality of reset keys 21 are provided, each reset key 21 may have the same size or different sizes; the setting position of various reset key 21 may be flexibly selected, preferably each reset key 21 is arranged on the same surface exposed on the shell 1, so that the user performs the operation only when facing the same surface of the shell 1, and the use convenience is improved.

The elastic member 31 may be a spring, a plurality of elastic members 31 may be provided, the elastic force may be applied to the reset seat 32 from a plurality of different positions when arranging the plurality of elastic members 31, so as to prevent tilt and shift of the reset seat 32 during a reset sliding process, thereby avoiding sliding blockage or stop of the reset seat 32.

Similarly, the reset seat 32 is exposed outside the shell 1, and a hole, a slot or a channel and the like may be drilled on the shell 1 so that the reset seat 32 passes through for exposure. A side that the reset seat 32 is exposed on the shell 1 and a side that the reset key 21 is exposed on the shell 1 are two opposite sides. Thus, when the user performs operation in the side, where the reset key 21 is located, the reset may be completed by pressing the reset seat 32 on an opposite side of the shell 1, so as to directly complete reset and carry out the next round of operation, and the operation is very convenient.

The pushing member 33 may be directly connected to the reset seat 32, or connected to the reset seat 32 through other intermediate elements, or directly formed on the reset seat 32 through an integrated forming method. The pushing member 33 may be columnar, blocky or pie-shaped, and the minimum requirement on the shape, length or thickness and the like is that the reset keys 21 depressed in the shell 1 is pushed under the drive of the reset seat 32 so as to complete the reset.

The reset keys 21 stressed and depressed inside the shell 1 may mean that the reset keys 21 are pressed to depress inside the shell or to slide into the shell 1, and the original bulge amount, relative to the shell 1, of the reset keys 21 is reduced; or mean that the reset keys 21 are pressed and deformed, and the reset keys 21 are depressed inside the shell 1 from the pressed position. Correspondingly, when the pushing member 33 pushes the reset keys 21 for resetting, the original reset keys 21, sliding and depressed in the shell 1 due to stress, will slide for resetting, and the original bulge amount relative to the shell 1 is recovered; and however, in other implementation modes, the original reset keys 21, deformed and depressed due to stress, will deform and reset, and the reset keys 21 recover the original shape.

Further, a hole, a slot, or a channel and the like may be punched on the shell 1 so that the reset keys 21 are exposed outside the shell 1.

Further, in some embodiments, the pressing assembly 2 further includes a rubber member (not shown in the figure), and a plurality of positions, away from the shell 1 direction, on the rubber member raise to form various reset keys 21.

It may be understood that the rubber member and the reset keys 21 are integrally formed. After the user presses the reset keys 21, the reset keys 21 will raise in a reverse direction, that is, the reset keys 21 are depressed in the shell 1. The rubber has the advantages of increased elasticity and easy deformation, for convenient operation of the user.

As shown in FIG. 2 to FIG. 7, in some embodiments, the reset keys 21 are hemi spheroidal.

It can be understood that the hemispheroidal reset keys 21 have the advantage of easy pressing, so that the surface, pressed by the user, is a curved surface, and the pressing comfort may be also improved.

As shown in FIG. 4 to FIG. 7, in some embodiments, the pressing assembly 2 further includes a support member 22 arranged in the shell 1, and a key board 24 provided with the reset keys 21.

A plurality of avoiding holes 221 are formed in the support member 22, various avoiding holes 221 correspond one by one and are flush with the reset keys 21, and the key board 24 is propped to the support member 22.

It can be understood that the support member 22 plays a role in supporting the key board 24, and the key board 24 plays a role in supporting each reset key 21. If the reset keys 21 are depressed in the shell 1 in a sliding manner after being pressed, the reset keys 21 are connected to the key board 24 by adopting a sliding structure; and if the reset keys 21 are depressed in the shell 1 in a deformation manner after being pressed, a hole needs to be punched on the key board 24 so as to provide a deformation space for the reset keys 21 and prevent the key board 24 from hindering the deformation of the reset keys 21. Similarly, the arrangement of the avoiding holes 221 may provide the deformation space for the sliding or deformed reset keys 21, so as to avoid the support member 22 blocking the reset keys 21, and at the same time, a space, through which the reset keys 21 are pushed for resetting, is avoided for the pushing member 33.

As shown in FIG. 4 to FIG. 7, in some embodiments, a positioning slot 222 is formed on a periphery of the support member 22, a positioning skirt 241 is arranged on a periphery of the key board 24, and the positioning skirt 241 is detachably inserted into the positioning slot 222.

It can be understood that a slot width of the positioning slot 222 is equal to or slightly greater than a width of the positioning skirt 241, and the positioning slot 222 is configured to contain the positioning skirt 241. The positioning skirt 241 is configured to be inserted into the positioning slot 222, so as to position the key board 24, ensure that the reset keys 21 can deform or slide correctly, and also ensure that the reset keys 21 can be reset correctly.

As shown in FIG. 4 to FIG. 7, in some embodiments, the pushing member 33 includes a plurality of pushing columns 331, which are arranged on the reset seat 32 in respective, and each pushing column 331 is driven by the reset seat 32 so as to correspond and push the reset keys 21 one by one for resetting.

It can be understood that the pushing columns 331 push the reset keys 21 under the drive of the reset seat 32, and along with sliding of the reset seat 32, the pushing columns 331 push the reset keys 21 to push the reset keys back outwardly, so that the reset keys 21 are reset. The resetting of the reset keys 21 may be deformation reset or sliding reset, which depends on preset installation and setting mode of the reset keys 21. The deformation reset means that when the reset keys 21 are pressed, they are deformed inwardly; and when the reset seat 32 is pressed by a user, the pushing columns 331 of the reset seat 32 pushes the reset keys back outwardly to restore to their original positions. The sliding reset means that when the reset keys 21 are pressed, they slide into an inside of the shell 1; and when the reset seat 32 is pressed by a user, the pushing columns 331 of the reset seat 32 pushes the reset keys to slide out of the shell to back to their original positions.

Figure 4:
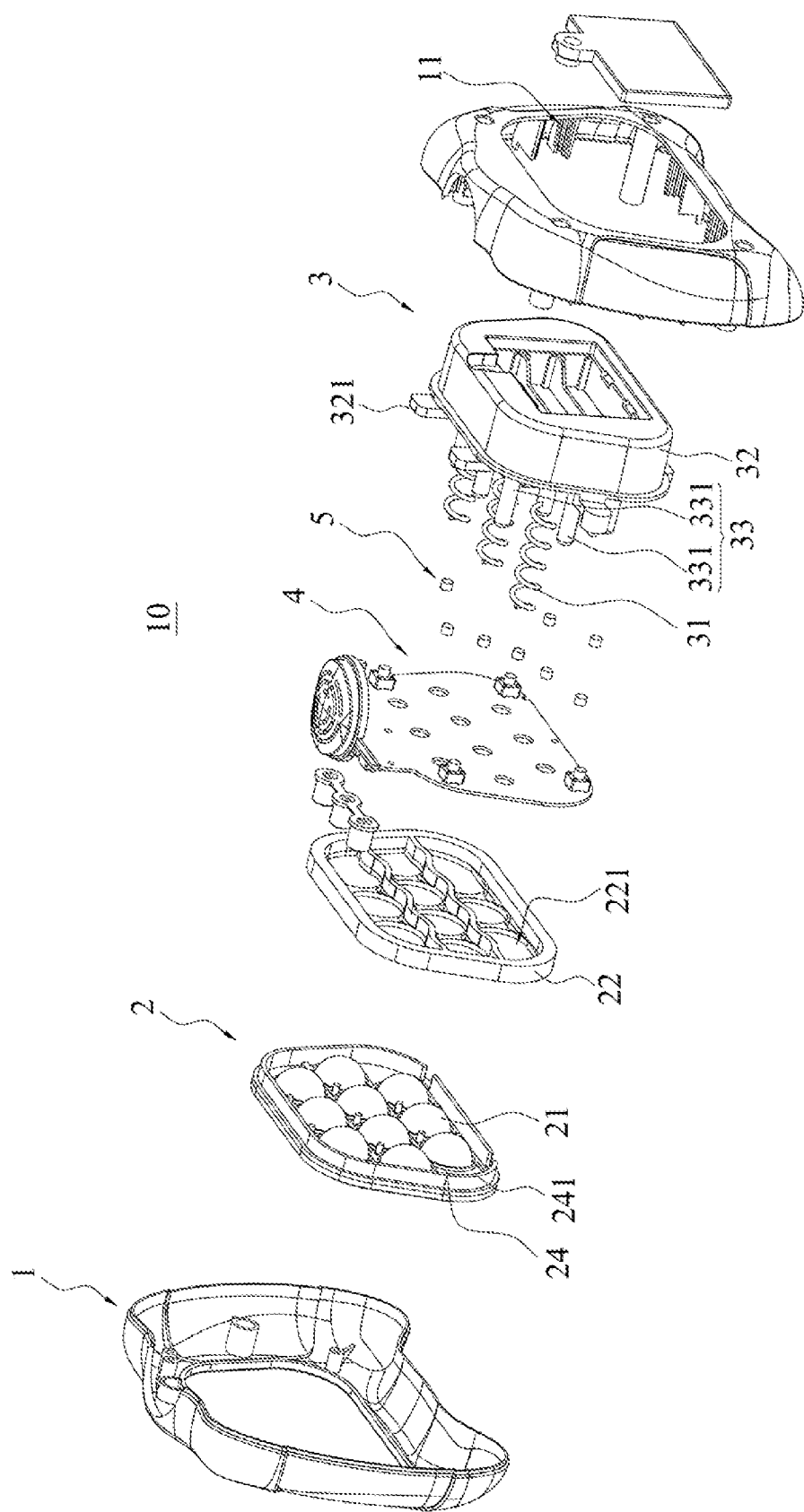
FIG. 4 is an exploded view of a key pressing toy with reset function shown in embodiments of the present disclosure.
Figure 5:
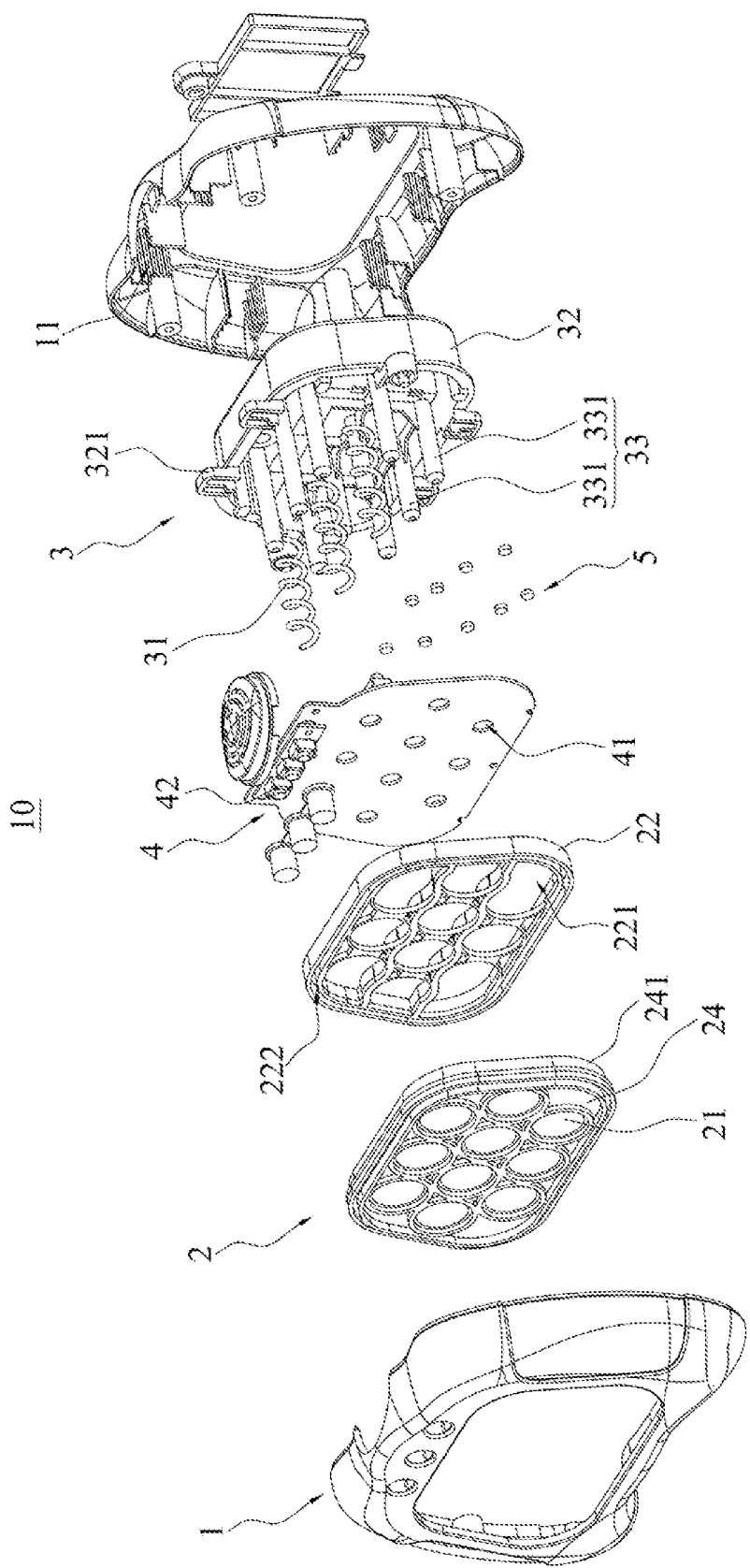
FIG. 5 is another exploded view of a key pressing toy with reset function shown in embodiments of the present disclosure.
Figure 6:
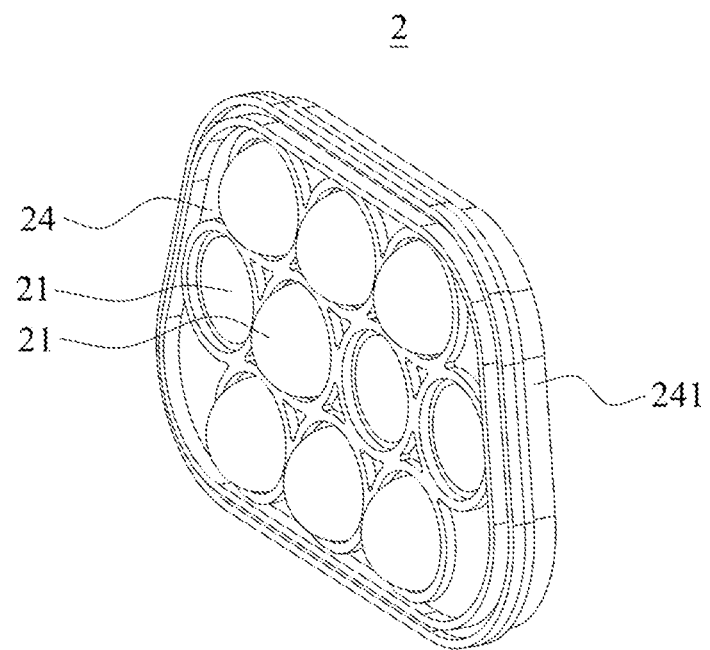
FIG. 6 is a structural schematic diagram of a pressing assembly shown in embodiments of the present disclosure.
Figure 7:
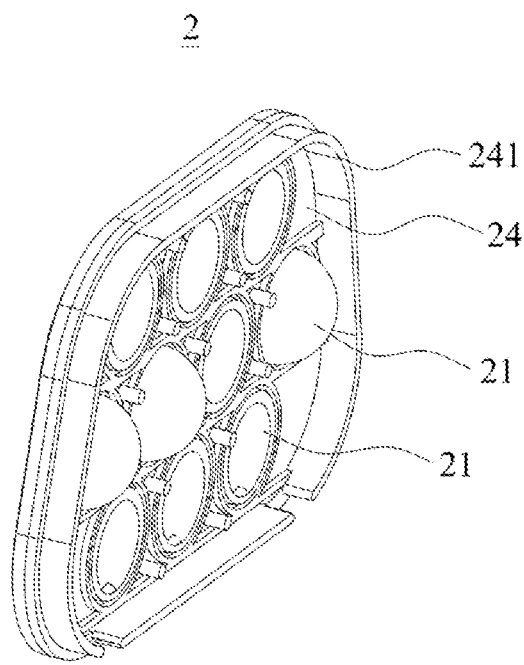
FIG. 7 is a schematic diagram of another structure of a pressing assembly shown in embodiments of the present disclosure.

As shown in FIG. 4 and FIG. 5, in some embodiments, the key pressing toy with reset function 10 further includes a circuit board 4, on which a plurality of through holes 41 are formed, and the through holes 41 are worn correspondingly to the pushing columns 331.

It can be understood that the circuit board 4 is used for electric control. An activity space is avoided for the pushing columns 331 by drilling the through holes 41, so that the pushing columns 331 can pass through the circuit board 4 and be pushed to the reset keys 21, and then the smooth resetting of the reset keys 21 is ensured.

As shown in FIG. 4 and FIG. 5, in some embodiments, at least one sliding slot 11 is formed in the shell 1, at least one sliding portion 321 is arranged on the reset seat 32, and the sliding portion 321 is slidingly arranged in the sliding slot 11.

It can be understood that the sliding slot 11 plays a role in guiding the sliding portion 321 to slide, and the sliding portion 321 is configured to drive the reset seat 32 to slide along a desired trajectory. When the reset seat 32 slides under the pressing of the user or resets and slides under the pushing of the elastic member 31, the sliding portion 321 is defined by the sliding slot 11, and a sliding trajectory of the reset seat 32 is thus defined.

As shown in FIG. 4 and FIG. 5, in some embodiments, a plurality of switches 42 are arranged on the circuit board 4, and each switch 42 is turned off due to the pushing of the reset seat 32.

It can be understood that each switch 42 may trigger different circuits on the circuit board 4 to work, the specific function of each switch 42 may be flexibly configured according to the structure of the circuit board 4, for example, the switch 42 may be configured with a power control function, or configured with a function for switching different working modes of the circuit board 4.

As shown in FIG. 4 and FIG. 5, in some embodiments, the key pressing toy with reset function 10 further includes a plurality of light-emitting members 5, which illuminate the reset keys 21 correspondingly.

It can be understood that whether the corresponding reset keys 21 need to be pressed according to the light-emitting member 5 whether to illuminate. The light-emitting member 5 may be configured to be installed on the circuit board 4, or configured to be installed on the pushing member 33. Besides, the light-emitting member 5 may be also configured to other positions capable of illuminating the corresponding reset keys 21.

The technical solution provided by the present disclosure may include the following beneficial effects.

The key pressing toy with reset function provided by the present disclosure relates to the technical field of toys. On the key pressing toy with reset function, the user can drive the pushing member to push and retract into the reset keys in the shell for resetting by pressing the reset seat exposed outside the shell, so as to quickly complete the reset of each reset key. Thus, the user does not need to disassemble the shell or gradually reset each reset key, so the reset convenient degree of the reset keys is effectively improved, and at the same time, the young user can complete the reset independently, and the age universality of the product is enhanced.

The solution of the present disclosure has been described in detail above with reference with the drawings. In the above embodiments, the description of each embodiment has its emphasis, and the part, not described in detail in some embodiments, may refer to the related description of other embodiments. Those skilled in the art may also know that actions and modules involved in the specification are not necessarily needed in the present disclosure. In addition, it can be understood that method steps of the embodiment of the present disclosure may be subjected to sequence adjustment, combination and deleted according to actual needs, and the device modules of the embodiment of the present disclosure may be subjected to combination, division and deletion according to the actual needs.

Various embodiments of the present disclosure have been described above, and the above specification is only exemplary instead of exhaustive, and not used to limit various disclosed embodiments. Without deviating from the scope and spirit of various embodiments of the present disclosure, many modifications and changes are apparent to those of ordinary skill in the art. The selection of the terms in the text is intended to explain the principle and actual application of each embodiment or the improvement of the technology in the market, or enable other ordinary skill in the art to understand various embodiments disclosed in this text.

What is claimed is:

1. A key pressing toy with reset function, comprising a shell, a pressing assembly arranged on the shell, and a reset assembly slidingly arranged on the shell;

the pressing assembly comprises a plurality of reset keys exposed outside the shell;

the reset assembly comprises an elastic member arranged in the shell, a reset seat slidingly arranged on the shell, a pushing member arranged on the reset seat, and the reset seat is exposed outside the shell; and when the reset keys are pressed, they will depress inside the shell, the reset seat drives the pushing member to slide, the pushing member pushes the reset keys back to their original positions, and the elastic member provides acting force that drives the reset seat to move away from the reset keys;

wherein the pushing member comprises a plurality of pushing columns, which are arranged on the reset seat, and each pushing column is driven by the reset seat so as to correspond and push the reset keys one by one for resetting;

wherein the key pressing toy with reset function further comprises a circuit board, on which a plurality of through holes are formed, and the pushing columns pass through the through holes correspondingly.

2. The key pressing toy with reset function according to claim 1, wherein the pressing assembly with reset keys is made of rubber.

3. The key pressing toy with reset function according to claim 1, wherein the reset keys are hemispheroidal.

4. The key pressing toy with reset function according to claim 1, wherein the pressing assembly further comprises a support member arranged in the shell, and a key board configured to support the plurality of reset keys; and a plurality of avoiding holes are formed in the support member, a plurality of avoiding holes correspond one by one to the reset keys, the reset keys extend through the avoiding holes respectively when pressed, and the key board is attached to the support member.

5. The key pressing toy with reset function according to claim 4, wherein a positioning slot is formed on a periphery of the support member, a positioning skirt is arranged on a periphery of the key board, and the positioning skirt is detachably inserted into the positioning slot.

6. The key pressing toy with reset function according to claim 1, wherein at least one sliding slot is formed in the shell, at least one sliding portion is arranged on the reset seat, and the sliding portion is slidingly arranged in the sliding slot.

7. The key pressing toy with reset function according to claim 1, wherein a plurality of switches are arranged on the circuit board, and each switch is turned off due to the pushing of the reset seat.

8. The key pressing toy with reset function according to claim 1, wherein the key pressing toy with reset function further comprises a plurality of light-emitting members arranged on the circuit board or on the pushing member, which illuminate the reset keys correspondingly.

* * * * *